Jan. 5, 1960 F. H. KRAMEN ET AL 2,919,592
PULLEY
Filed Feb. 4, 1957 2 Sheets-Sheet 1

INVENTOR.
FRANK H. KRAMEN
DOMINICK L. PREVITE
BY
ATTORNEY

United States Patent Office 2,919,592
Patented Jan. 5, 1960

2,919,592

PULLEY

Frank H. Kramen, Cleveland, and Dominick L. Previte, Cleveland Heights, Ohio, assignors to Eaton Manufacturing Company, Cleveland, Ohio, a corporation of Ohio Application February 4, 1957, Serial No. 638,083

5 Claims. (Cl. 74—230.8)

Broadly, this invention relates to a sheave or pulley construction and more particularly to a stamped two-piece pulley means adapted to be secured to a shaft wherein an intermediate or hub member is eliminated from the structure.

In the past, pulleys have been designed and constructed wherein adaptation to a shaft means involved the use of an intermediary or hub member, secured to the pulley body enabling simultaneous rotation with the shaft. In other pulley designs, material from the body of the pulley was bent and formed to the shape of a hub or intermediate member whereupon the securement of such a pulley to the shaft means required the use of supplementary parts in the form of pins or screws inserted in the shaft portion or required other similar means of restricting the pulley rotation to that of the shaft.

The pulley design in this application is such as to facilitate the securement of the sheave to the shaft portion through the two basic elements of the pulley body without excessive deformation of the body material or additional means to provide simultaneous rotation of the two elements.

The invention is designed to accommodate the pre-existing requirements of pulley and shaft assemblies along with several new and novel functions disclosed herein.

An object of this invention is to provide a pulley comprising a pair of stamped metal segments having stamped openings in their center portions adapted to receive and be secured to a shaft member.

Another object of this invention is to provide a pulley means of the above character wherein the stamped openings are adapted to receive a shaft member, in a manner as to radially and axially locate the pulley on the shaft.

Another object of this invention is to provide a stamped two-segment pulley adapted to receive a frusto-pyramidal end portion of a shaft member and a means of securing the pulley to the shaft end.

A still further object of this invention is to provide a pulley having a pair of stamped metal segments easily adaptable for securement to a shaft member wherein the production is of a simple and economical nature.

Further objects and advantages of the invention will appear from the following description taken in connection with the drawings forming a part of the specification and in which, Figure 1 is a cross-sectional view of the pulley and shaft in assembled form.

Figure 1:
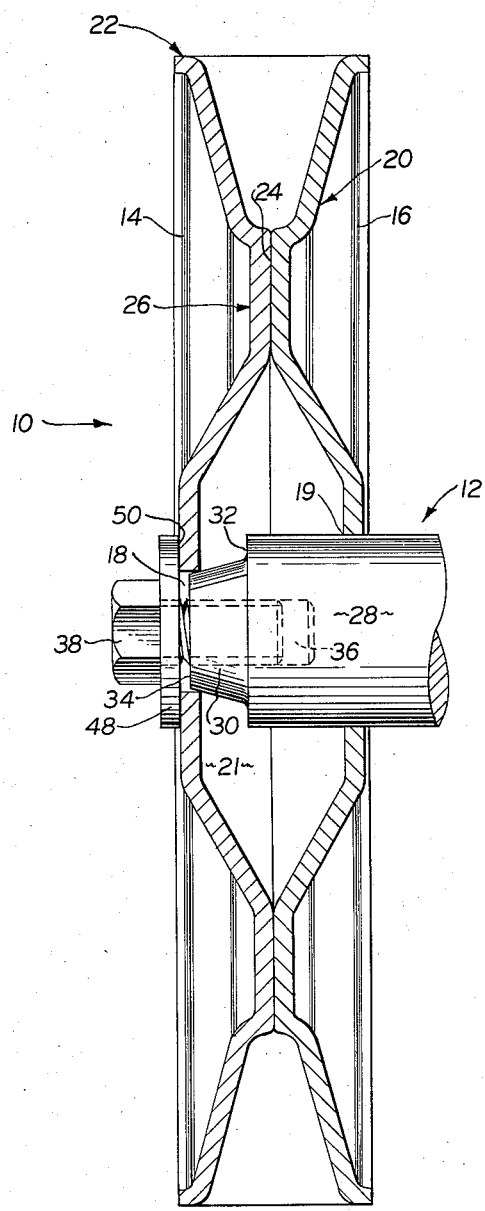

Referring to the drawings for more specific details of the invention, Figure 1 illustrates the pulley 10 and shaft 12 in their assembled form.

The pulley 10 comprises a pair of attached members being in the form of symmetrical stamped metal segments 14 and 16. The metal segments 14 and 16 as stamped, are provided with central openings 18 and 19 respectively therein. Radially extending from the openings, the segments 14 and 16 each include dished portion 20 having a flange portion 22 at its outer periphery. Upon securement through spot welding or similar securing means of the two members 14 and 16, placed back to back, the contact area 24 consists of depressed flat parallel portions 26 of the dished portion 20 of the segments. A V-shaped groove is formed by the portion of the members radially extending outwardly between the contact area and flange portion at the outer periphery of the segments. Extending radially inwardly from the contact area, a hollow space 21 is provided by the segmental structure wherein the opening 18 is axially spaced from the opening 19 formed in segment 16 of the pulley body.

The symmetrical structure of the pulley basically differs in the shape and size of the stamped openings 18 and 19; opening 19 being of substantially greater size and circular in formation.

Let it be known that the structural limitations imposed by the disclosure and the drawings pertain to that one type of pulley and is used merely for descriptive purposes while the basic idea or invention lies in the center portions, that being the openings in the segments and also the shaft structure including the adaptation of the two members to be secured.

The stamped opening 18 in segment 14 is of an oblong shape adaptable to receive a complementary portion of the shaft member 12 whereby a non-rotative coupling is provided therebetween. The opening 19 of segment 16 is circular in form and is fitted in close contact with the shaft member and is of a substantially larger diameter than the largest dimension of opening 18.

Figure 3:
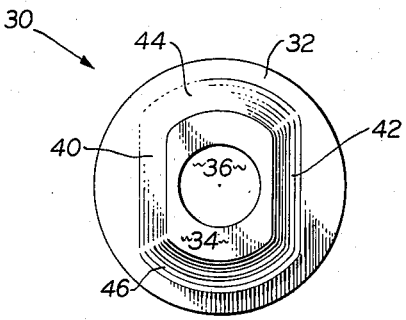
Figure 3 is an enlarged end view of the shaft member.
Figure 2:
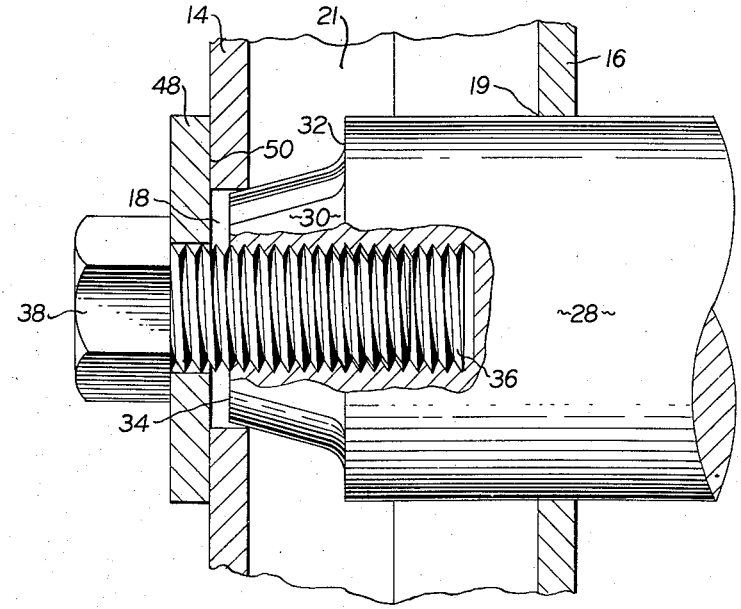
Figure 2 is an enlarged sectional view of the shaft and pulley at the securement area.

The shaft member 12 shown in Figure 1, with enlarged views seen in Figures 2 and 3, has a main body portion 28, an end portion 30 formed in a modified frusto-pyramidal shape, and a shoulder 32 at the junction therebetween.

The end portion 30 has an end face 34 having a threaded opening 36 therein adapted to receive a bolt 38 or similar securing means. The frusto-pyramidal shape shown in Figure 3 is obtained by forming the end portion so as to have a pair of opposed surfaces 40 and 42 tapered convergently toward the end face. Adjacent the said faces, a pair of diametrically opposed arcuate surfaces 44 and 46 extend divergently from one another from the end face 34 toward the shoulder portion 32. Opening 18 corresponds in shape to the cross-sectional shape of end portion 30 so that mating thereof is assured providing for keyed relation therebetween as well as a positive centering means.

The assemblance of the pulley with the shaft member, coordinating the corresponding described portions of each member, is as follows: the pulley body is placed on the shaft member and positioned in a manner as to have the opening 19 encompassing the shaft portion 28 and radially locating the pulley body. The opposed opening 18 remote from the shaft body receives the substantially frusto-pyramidal end portion 30 of the shaft and axially positions the pulley body which abuts a periphery of the end portion 30. The securement of the pulley and shaft portions is obtained by the bolt means 38 inserted into the threaded opening 36 having a washer member 48 axially positioned therebetween. Sufficient clearance is alloted between an inner face 50 of the washer and the end face 34 of the shaft member to permit the tightening of the bolt, eliminating any slack or clearance occurring between the substantially frusto-pyramidal end portion and the pulley opening during the operation of the members.

It is obvious that instead of a bolt means insertable in the shaft end, a threaded stud means and locking nut can be provided, which projects axially from the modified frusto-pyramidal end portion to secure the pulley body to the shaft.

This novel structure when secured produces a keying or wedging action due to the shaft end and cooperative pulley opening providing conjoint rotation between the two members.

While the invention has been described in connection with certain specific embodiments, the mechanism involved is susceptible of numerous other applications that will readily occur to men skilled in the art. Therefore, the invention is limited only as indicated by the scope of the appended claims.

What we claim is:

1. A pulley and shaft assembly comprising a pair of stamped metal segments adjacent and secured to one another, said segments having central openings, said openings being respectively circular in one segment and of an oblong shape in the other segment adapted to receive an end portion of a shaft member therein, said shaft member comprising a body portion received by said circular opening, and a tapered substantially frusto-pyramidal end portion received by said oblong shaped opening.

2. A pulley and shaft assembly, comprising a shaft member including a body portion and a tapered substantially frusto-pyramidal neck portion adjacent said body portion, assembly securing means extending from the neck portion, and a pulley member including a pair of stamped segments, said segments having axially aligned central openings receiving one end of said shaft member, one of said openings being circular in shape receiving the body portion of the shaft member remote from said securing means, said other opening being co-operative with said neck portion whereupon securement of the members by said securing means fixes said pulley member with said shaft member for mutual rotation.

3. A pulley and shaft assembly wherein the pulley comprises a pair of stamped segments secured to one another and spaced from one another centrally thereof, each of the spaced apart central sections having an opening therein of a desired shape receiving a shaft member, said shaft member comprising a body portion and a substantially frusto-pyramidal end portion, said end portion having two diametrically opposite surfaces converging toward an end face thereof and two arcuate diametrically opposite surfaces disposed intermediate the first opposite surfaces and converging toward the end face with said opening in one segment receiving the body portion and said opening in the other segment receiving the end portion.

4. A pulley and shaft assembly comprising a pair of stamped metal segments secured to one another, said segments having axially aligned center openings formed therein spaced from one another adapted to receive a shaft member, said opening in one segment being circular in form, said opening in the other segment being of a lesser diameter, and a shaft member assembled with said pulley wherein said circular opening is positioned over a body portion of said shaft member with said lesser diameter opening receiving an end portion formed from said shaft member wherein a keying action is provided by said end portion and said second opening for coupling the pulley and shaft members together.

5. A pulley and shaft assembly comprising a pulley body defined by a pair of metal segments having central openings therein, said segments being spaced at their central portions axially spacing said openings, said openings being adaptable to receive a shaft member, said shaft member having a body portion and a tapered end portion inserted into said pulley body and axially placed so as to have one opening encircling said body portion radially positioning said pulley body with the other opening being so positioned as to receive said end portion of the shaft member with end surface engagement between said shaft end portion and said segment having said other opening therein axially positioning said pulley body on the shaft member, said segments and shaft member being axially secured together by means engageable between one segment and said shaft member with a keying action being produced by said end portion and said other opening so as to fix said pulley to said shaft member for simultaneous rotation.

References Cited in the file of this patent

UNITED STATES PATENTS

| 610,724 | Rocholl | Sept. 13, 1898 |
| 1,709,492 | Seelbach | Apr. 16, 1929 |
| 2,489,178 | Galbreath | Nov. 22, 1949 |
| 2,620,675 | Meadows et al. | Dec. 9, 1952 |
| 2,656,730 | Mitchell | Oct. 27, 1953 |

FOREIGN PATENTS

| 24,428 | Great Britain | of 1895 |